No. 734,295. PATENTED JULY 21, 1903.
D. S. BLANPIED.
COMBINED CIGAR CUTTER, PIPE TAMPER, AND PIPE CLEANER.
APPLICATION FILED OCT. 18, 1902.
NO MODEL.
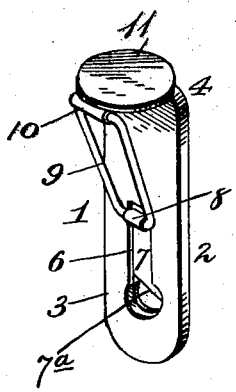
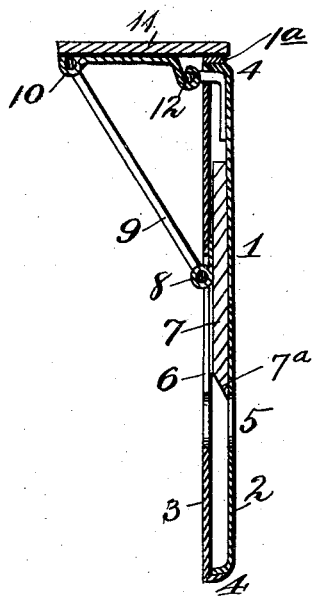
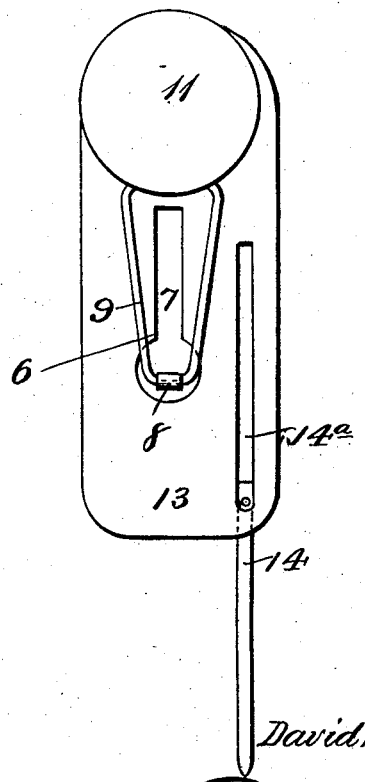
Witnesses:
F. L. Ourand
Frank G. Radelfinger.
Inventor.
David S. Blanpied
By Louis Bagger & Co.,
Attorneys.
THE NORRIS PETERS CO., PHOTO-LITHO., WASHINGTON, D. C.

No. 734,295. Patented July 21, 1903.

UNITED STATES PATENT OFFICE.

DAVID S. BLANPIED, OF NEWTONVILLE, MASSACHUSETTS.

COMBINED CIGAR-CUTTER, PIPE-TAMPER, AND PIPE-CLEANER.

SPECIFICATION forming part of Letters Patent No. 734,295, dated July 21, 1903.

Application filed October 18, 1902. Serial No. 127,873. (No model.)

*To all whom it may concern:*

Be it known that I, DAVID S. BLANPIED, a citizen of the United States, residing at Newtonville, in the county of Middlesex and State of Massachusetts, have invented new and useful Improvements in a Combined Cigar-Cutter, Pipe-Tamper, and Pipe-Cleaner, of which the following is a specification.

My invention relates to a combined cigar-cutter, pipe-tamper, and pipe-cleaner, and has for its object to construct a device of this character which will be simple in construction, efficient in operation, and which can be carried in the pocket.

The novel construction employed by me in carrying out my invention is fully described and claimed in this specification, and illustrated in the accompanying drawings, forming a part thereof, in which—

Figure 1 is a perspective of my device. Fig. 2 is a longitudinal section thereof. Fig. 3 is a plan of a modified form of my device.

The numeral 1 designates a casing comprising a front 2 and back 3, having a crimped edge or flange 4 thereon which engages the front 2. An aperture 5 is formed in the front 2 and a keyhole-slot 6 in the back 3. Slidingly mounted in the casing 1 is a knife 7, having a diagonal edge 7ª thereon to adapt it to make a shearing cut. The knife 7 carries a keeper 8, which is engaged by one end of a link 9, the other end of which engages a keeper 10, mounted on a circular disk 11, pivoted to the end of the casing 1 by a keeper 12, which engages a pintle. The keeper 12 is so located that the end 1ª of the casing 1 serves as a stop to limit the movement of said disk and constrain it to assume a position at right angles to the casing 1 when turned up as far as possible.

In the modified form illustrated in Fig. 3 the casing 13 is made wide enough to accommodate a pipe-cleaner 14, which fits an aperture 14ª therein.

In using, a cigar-tip is inserted in the aperture 5 within the path of the knife 7, which can then be operated by placing one thumb on the disk 11 to sever the tip of the cigar. When it is desired to tamp the tobacco in a pipe, the disk 11 is turned up at right angles to the casing 1, as shown in Fig. 2, the casing 1 grasped between the thumb and forefinger with the thumb engaging the link 9, the disk 11 inserted in the pipe-bowl, and the tobacco tamped without burning the fingers.

I do not wish to be limited as to details of construction, as these may be modified in many particulars without departing from the spirit of my invention.

Having thus described my invention, what I claim as new, and desire to secure by Letters Patent, is—

1. In a cigar-cutter, the combination of a casing having an aperture in one side and a slot in the other, a knife slidingly mounted in said casing and located to sever the end of a cigar inserted in said aperture, a disk pivoted to said casing, and a link pivoted to said disk and to said knife, substantially as described.

2. In a cigar-cutter, the combination of a casing having an aperture in one side and a keyhole-slot in the other, a knife slidingly mounted in said casing, a keeper mounted on said knife and located to slide in said slot, a disk pivoted to said casing and arranged to assume a position at right angles thereto, and a link connected to said disk and to said keeper, substantially as described.

3. In a cigar-cutter, the combination of a casing having an aperture therein to accommodate the tip of a cigar, a knife slidingly mounted in said casing and designed to cut off a tip inserted in said aperture, a disk pivoted to said casing, a rigid member pivoted at its extremes in said disk and said knife to enable said knife to be operated by actuating said disk, substantially as described.

4. In a cigar-cutter and pipe-tamp, a hollow casing designed to serve as a handle in using the device as a tamp, a circular disk to serve as a packer in tamping the tobacco within the pipe pivoted to the end of said casing and located to engage the end thereof when standing at right angles to said casing, a knife slidingly mounted in said casing, and a rigid member pivoted to said disk and said knife, substantially as described.

In testimony whereof I have hereunto set my hand in presence of two subscribing witnesses.

DAVID S. BLANPIED.

Witnesses:
UNRIAH J. HAMILTON,
O. E. MILLS.